United States Patent [19]

Zuber et al.

[11] 4,349,780
[45] Sep. 14, 1982

[54] SENSOR DEVICE FOR CONTINUOUS MEASUREMENT OF JACKET THICKNESS ON A CABLE

[75] Inventors: Bretislav Zuber; Jaroslav J. Kral, both of Montreal, Canada

[73] Assignee: Northern Telecom Limited, Canada

[21] Appl. No.: 93,397

[22] Filed: Nov. 13, 1979

[51] Int. Cl.³ .................. G01R 33/00; G01B 7/10
[52] U.S. Cl. ................................ 324/262; 324/229
[58] Field of Search ................. 324/234, 235–243, 324/260–262, 230, 229, 374; 33/178 E

[56] References Cited

U.S. PATENT DOCUMENTS

| | | | |
|---|---|---|---|
| 1,933,547 | 11/1933 | Drake et al. | 324/241 |
| 3,914,686 | 10/1975 | Brooks | 324/347 |
| 4,034,293 | 7/1977 | Roch | 324/158 P |
| 4,101,832 | 7/1978 | Baker et al. | 324/227 |
| 4,105,972 | 8/1978 | Smith | 324/242 |
| 4,137,639 | 2/1979 | Zumbach | 33/178 E |

Primary Examiner—Gerard R. Strecker
Assistant Examiner—Walter E. Snow

[57] ABSTRACT

A device for the continuous measurement of the jacket thickness on a cable, comprising a body and a mounting arm. The body has at least two spaced sensors one in advance of the other and providing a lower bearing surface of the head, the body carrying a flexible diaphragm assembly. The mounting arm has one end portion fixable to a base and the other end portion fixed to the head through the diaphragm assembly. The mounting arm lies in the plane of the sensors and extends obliquely from the head with respect to the lower bearing surface of the head and is laterally resilient. The arm is constructed and arranged whereby the head is movable substantially perpendicular to the plane of the lower bearing surface of the head when the arm is fixed to the base.

4 Claims, 2 Drawing Figures

U.S. Patent     Sep. 14, 1982     4,349,780
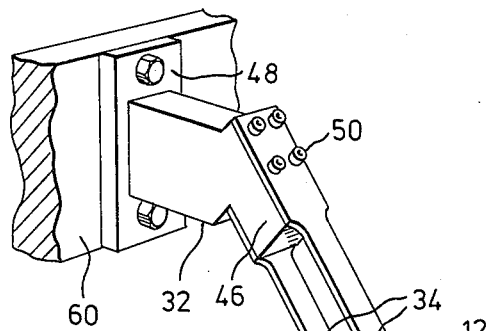
FIG. 1
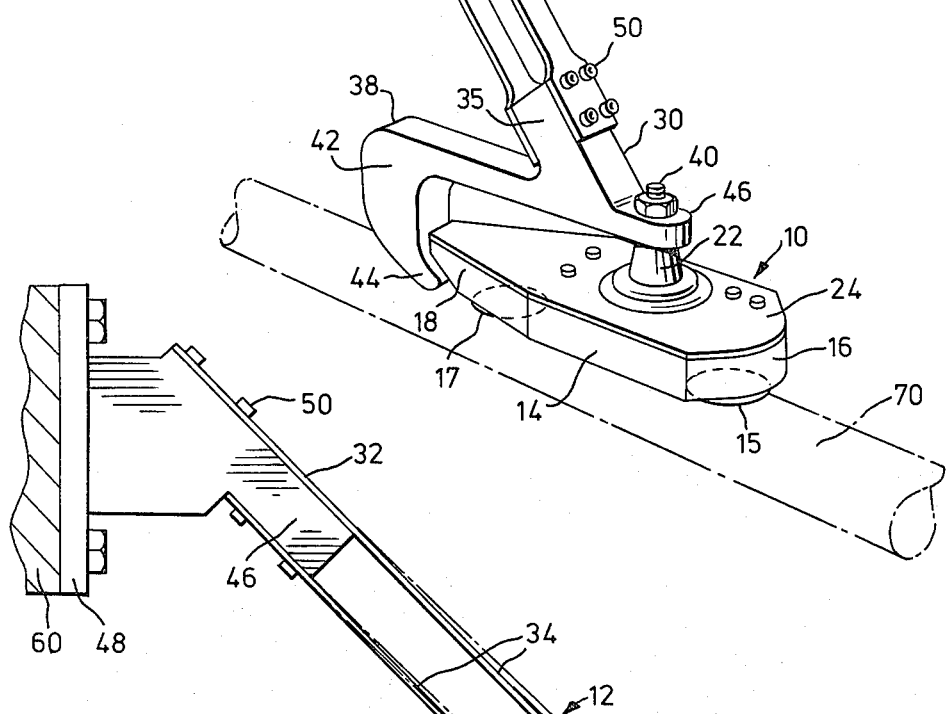
FIG. 2
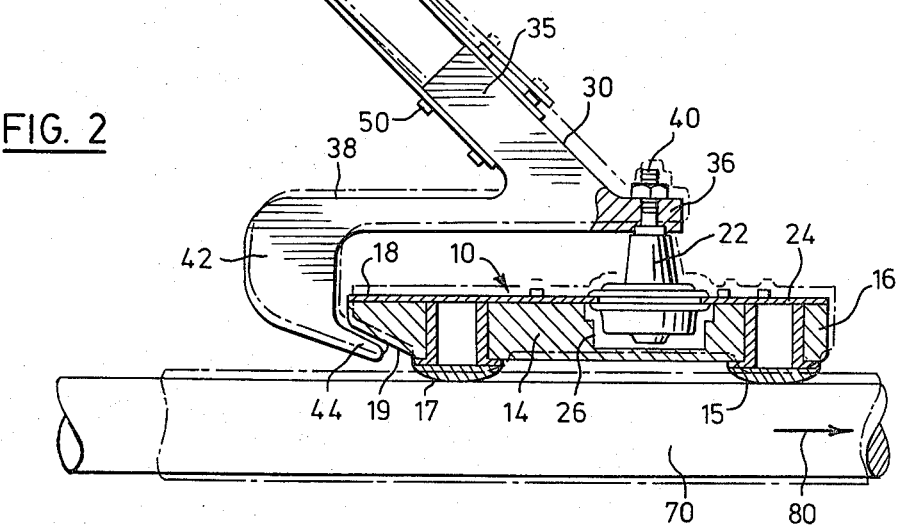

SENSOR DEVICE FOR CONTINUOUS MEASUREMENT OF JACKET THICKNESS ON A CABLE

FIELD OF THE INVENTION

This invention relates to the mounting of a head to measure the jacket of an electric cable.

BACKGROUND OF THE INVENTION

A head presently in use measuring the jacket thickness of an electric cable uses an inductive probe which follows the indulations of the cable surface as the cable moves continuously past the head. The head maintains a predetermined orientation and, if moved, returns to the same position. Examples of such a head are disclosed in U.S. Pat. No. 4,051,430 issued Sept. 27, 1977 to Louis G. Miliette et al and U.S. Pat. No. 4,064,634 issued Dec. 27, 1977 to Dan B. Davis, both assigned to Northern Telecom Limited.

On disadvantage of the above-mentioned head is that it does not accommodate a rapid increase in cable diameter such as that produced by a bulge in the cable jacket. Also, the complexity of the supporting mechanism makes it difficult to maintain in operational condition. Other disadvantages are that variable pressure of the device may cause scoring the cable jacket and vibration may result in incorrect measurements.

SUMMARY OF THE INVENTION

A device for the continuous measurement of the jacket thickness on a cable, comprising: a head having at least two sensors providing a lower bearing surface of the head, the head carrying a flexible diaphragm assembly, the sensors being spaced apart one in advance of the other; and a mounting arm lying in a plane normal to said bearing surface, the arm comprising a parallelogram linkage of two parallel leaf springs, one end portion of the arm having an end member secured to the leaf springs, the end member being fixable to a base and the other end portion of the arm being fixed to the head through the diaphragm assembly whereby higher frequency vibrations in the head are prevented from being transferred to the arm, the arm extending obliquely from the head with respect to the lower bearing surface thereof and being laterally resilient by means of the leaf springs whereby the head is movable in an arc while maintaining the lower bearing surface of the head substantially parallel to a predetermined plane normal to said mounting arm plane when the arm is fixed to the base.

BRIEF DESCRIPTION OF THE DRAWINGS

An example embodiment of the invention is shown in the accompanying drawings in which:

FIG. 1 is a perspective view of a mounting head; and

FIG. 2 is a side elevational view of the mounting head of FIG. 1, partly in cross-section.

The examle embodiment consists of a measuring head 10 and a mounting 12. Head 10 comprises an elongated body 16 carrying a probe or sensor 15 adjacent a forward end of the body and a probe or sensor 17 adjacent a rearward end 18 of the body which has an upwardly sloping under surface 19. One sensor measures the wall thickness of the jacket of a cable while the other sensor measures changes in the temperature of the jacket on which head 10 rests, both in known manner. Sensors 15 and 17 provide a lower bearing surface for head 10.

Measuring head 10 carries a flexible diaphragm assembly 22 which is integral with a top plate 24 fixed to the head, the lower portion of the diaphragm assembly being accommodated in a recess 26 in body 14. Diaphragm assembly 22 may be any suitable anti-vibration unit which will filter out high frequency vibrations such as those created by corrugations in the cable being monitored. An example of such a unit is commercially available for use in five instruments and sold under the trade mark LORD KINEMATICS by Canrep Ltd. of Montreal, Canada.

Mounting 12 comprises a pair of spaced end members 30, 32 interconnected by a pair of spaced parallel leaf springs 34. End member 30 has a shank 35 from which extends a boss 36 and a shoe 38. Head 10 is mounted on end member 30 by a bolt 40 of diaphragm assembly attached to boss 36. Shoe 38 is curved downwardly to form a shoulder 42 positioned adjacent the rearward end 18 of housing 14 and a lip 44 which underlies sloping undersurface 19. End member 32 has a shank 46 carrying a base plate 48. Leaf springs 34 are fixed to shanks 35 and 46 of end members 30 and 32 by bolts 50 and are oriented with respect to head 10 so that they are positioned at an oblique angle to the head, preferably at an angle of about forty degrees.

In the operation of the example embodiment the device is mounted by bolting base plate 48 to a suitable base 60 with head 10 located parallel to the path of a cable 70. Head 10 is oriented to bear laterally against cable 70 with sensors 15 and 17 riding along the surface of the cable as the cable moves in the direction of arrow 80 as seen in FIG. 2. A plurality of the devices of the invention may be employed in an array circumscribing cable 70 as seen for example in aforementioned U.S. Pat. Nos. 4,051,430 and 4,064,634.

Head 10 rides on cable 70 as the cable travels continuously past the head. Any moderate increase in the diameter of the cable will cause head 10 to move laterally and the movement of the head will be accommodated by springs 34 and mount 12 will act somewhat as a parallelogram so that the movement of the head will be substantially perpendicular to the surface of the cable, as seen in the chain dotted lines in FIG. 2 of the drawings. When the diameter of the cable is again reduced or increased springs 34 will return the head to its former position, thus maintaining the head constantly bearing against the cable with substantially constant pressure despite the fluctuations in the cable diameter.

Higher frequency vibrations such as those caused by a corrugated surface on cable 70 are filtered out by diaphragm assembly 22.

shoe 38 is provided to protect head 10 against sudden large increases in the diameter of cable 70, for instance where the end of the cable of one reel is spliced to the cable of the next reel to maintain continuous operation of the apparatus and the diameter is locally decreased. When the subsequent bulge in cable 70 contacts shoe 38 and passes beneath lip 44, springs 34 allow head 10 to rise and this prevents damage to the head and to sensors 15 and 17. Lip 44 is spaced above the bearing surfaces of sensors 15 and 17 a predetermined distance so that shoe 38 will not interrupt the operation of the sensors for minor fluctuations in the cable diameter.

We claim:

1. A device for the continuous measurement of the jacket thickness on a cable, comprising:

a head having at least two sensors providing a lower bearing surface of the head, the head carrying a flexible diaphragm assembly, the sensors being spaced apart one in advance of the other; and a mounting arm lying in a plane normal to said bearing surface the arm comprising a parallelogram linkage of two parallel leaf springs, one end portion of the arm having an end member secured to the leaf springs, the end member being fixable to a base and the other end portion of the arm being fixed to the head through the diaphragm assembly whereby higher frequency vibrations in the head are prevented from being transferred to the arm, the arm extending obliquely from the head with respect to the lower bearing surface thereof and being laterally resilient by means of the leaf springs whereby the head is movable in an arc while maintaining the lower bearing surface of the head substantially parallel to a predetermined plane normal to said mounting arm plane when the arm is fixed to the base.

2. A device as claimed in claim 1 in which the arm extends from the measuring head at an angle of about forty degrees with respect to the lower bearing surface of the head.

3. A device as claimed in claim 1 in which the arm carries means to deflect the measuring head laterally upwardly with respect to the lower bearing surface thereof, said means being spaced upwardly from the plane of said lower bearing surface.

4. A device as claimed in claim 3 in which the deflection means comprises a shoe extending laterally from the arm and spaced a predetermined distance from said lower bearing surface.

* * * * *